United States Patent [19]

Manvell

[11] Patent Number: 4,927,653

[45] Date of Patent: May 22, 1990

[54] STERILIZED FOODSTUFF PREPARATION

[75] Inventor: Clive Manvell, East Hanney, England

[73] Assignee: CMB Packaging (UK) Limited, Worcester, United Kingdom

[21] Appl. No.: 366,294

[22] Filed: Jun. 13, 1989

Related U.S. Application Data

[63] Continuation of Ser. No. 38,467, Apr. 14, 1987, abandoned, which is a continuation of Ser. No. 663,237, Oct. 22, 1984, abandoned.

[30] Foreign Application Priority Data

Oct. 27, 1983 [GB] United Kingdom ............... 8328725

[51] Int. Cl.$^5$ .......................... A23L 1/01; A23L 3/00
[52] U.S. Cl. ................................. 426/399; 426/438; 426/521
[58] Field of Search .................. 422/38; 426/392, 397, 426/399, 407, 438, 439, 521

[56] References Cited

U.S. PATENT DOCUMENTS

| | | | |
|---|---|---|---|
| 3,035,918 | 5/1962 | Sorgenti et al. | 99/1 |
| 3,245,800 | 4/1966 | Sanders | 426/439 |
| 3,537,867 | 11/1970 | Glasser et al. | |
| 4,110,481 | 8/1978 | Albright et al. | 426/438 |
| 4,234,537 | 11/1980 | Hersom et al. | 426/521 |

FOREIGN PATENT DOCUMENTS

| | | | |
|---|---|---|---|
| 0783527 | 4/1968 | Canada | 426/438 |
| 548361 | 10/1942 | United Kingdom. | |
| 1222193 | 2/1971 | United Kingdom. | |
| 1248629 | 10/1971 | United Kingdom. | |
| 1507682 | 4/1978 | United Kingdom. | |

OTHER PUBLICATIONS

The Science of Meat and Meat Products, American Meat Institute Foundation, p. 278 (in Polish, and translation into English).

Przemysl Spozywczy, Tom XXX, p. 90.

Sair et al., "The Use of Antioxidants in Deep Fat Frying", Food Tech.; Feb. 1951; pp. 69–73.

Postolski et al, Food Freezing; WNT, Warsaw, Poland, 1974, pp. 236–238.

Primary Examiner—Marianne Cintins
Attorney, Agent, or Firm—Christie, Parker & Hale

[57] ABSTRACT

Solid foodstuffs, such as chips, are sterilized for subsequent aseptic packaging and non-refrigerated storage in a hot fluid medium within a closed reaction vessel, under an applied pressure such as to elevate the boiling point of water in the product to at least the minimum lethal temperature for the most harmful micro-organisms and spores that may be present.

9 Claims, 2 Drawing Sheets

STERILIZED FOODSTUFF PREPARATION

This application is a continuation of U.S. patent application Ser. No. 07/038,467, filed Apr. 14, 1987, now abandoned, which was a continuation of U.S. patent application Ser. No. 06/663,237, filed Oct. 22, 1984, and also abandoned.

This invention relates to processes for sterilizing and packaging solid food products for subsequent storage of the at ambient temperature.

All foods, deteriorate in the course of time, usually due to enzymic or microbiological action. Micro-organisms may be present in the natural product or, in the absence of suitable packaging or other protection, may reach the product from outside.

The classic form of packaging for foodstuffs, for long-term ambient temperature storage, involves the heating for a predetermined period of time, at a temperature suitable for destroying significant micro-organisms and their spores. This heating does have the additional effect of partly cooking the food product in the container; and the applied heat may affect the colour, texture and flavour of the product adversely.

The metal can has been widespread for so long partly because, (provided the product is suitable, its preparation and processing are carried out correctly, and the integrity of the can itself is satisfactory) food can be stored for very long periods of time without significant deterioration in palatability, and almost indefinitely without any danger of toxicity arising.

Foods may be preserved by other methods for long term storage at ambient temperature. One such method is dehydration, in which the water is removed by a variety of processes (such as heating under vacuum or freeze drying). The product then contains insufficient water to support the metabolism of vegetative cells of bacteria, yeasts and moulds; whilst the conditions are so adverse that the spores of these organisms are unable to germinate, even though they may be present in large numbers. These products are known in the trade as "dry goods", and may be packed in containers which are not airtight. Examples include sugar and tea.

Not all foodstuffs can be preserved in this way. The drying process often removes volatile components which are essential elements of flavour profiles; whilst the quality of the finished product depends on its rehydration properties. Dehydrated meats, for example, always remain chewy and tough after rehydration.

Many foods can be packaged for storage under deep-freeze conditions for very long periods. Deep freezing preserves the food by inhibiting the metabolism of all the organisms within the product, whether or not they cause the product to deteriorate. Such products may be packed in metal cans, but are more frequently packed in containers which are usually made of paperboard or plastics materials, or metal foils, or combinations of these materials.

Deep-frozen products have the advantage that they do not need severe heat processing before being frozen. The product, or the filled package, is usually quick-frozen, i.e. frozen over a very short period of time. Quick-frozen raw products such as vegetables, when eventually thawed out for use, are substantially in the same fresh condition in which they were packed. Quick-frozen pre-cooked foods suffer substantially no change in their condition between freezing and thawing.

The principal disadvantage of freezing as a means of preservation is one of cost. Frozen conditions must be maintained during processing, and subsequently through storage, distribution, retailing and at the point of use until such time that they are going to be used. In practical terms this can be many months; in energy terms it is naturally relatively expensive. In addition the end product is frequently not in a convenient ready-to-use form until it has undergone lengthy thawing.

Furthermore, some products are partly or fully cooked before being frozen, with the intention that, after being thawed, they merely require to be re-heated for immediate consumption, or re-heated in suitable conditions (for example by frying) in order to complete the cooking process.

The flavours and textures characteristic of canned food products have over the years proved acceptable to the consumer in respect of many such products. Nevertheless, changes in texture and flavour are unacceptable to some consumers, and there is an increasing climate of opinion against the use of artificial colouring matter and other additives. Furthermore, many food products are, for one reason or another, quite simply unsuitable for canning.

A solution, which is gaining popularity, to the problem of obtaining long-term storage of foodstuffs without the need for either metal cans with heat processing or continuous frozen storage, is the use of so-called "aseptic" packaging. In aseptic packaging systems, the food product is packed in pre-sterilised containers under sterile conditions; for example it may be loaded into the containers, and the latter closed and hermetically sealed, within an enclosure in which the atmosphere, consisting of a sterile gaseous medium, is maintained at a pressure slightly higher than the ambient pressure, so that the enclosure contains no non-sterile gas. The subsequent life of the pack before it deteriorates, (or possibly becomes toxic), depends of course on the effectiveness of the barrier properties of the container against ingress of air or of harmful organisms or their spores. However, with many food products, aseptic packs have a useful shelf-life not dissimilar from that of equivalent frozen food packs, or even of the same products when canned and processed.

The aseptic pack can be stored in ambient conditions. The container may take any one of a number of forms, provided that its barrier properties, mentioned above, are suitable for the intended application. Examples include various containers of plastics materials, and indeed metal cans.

Aseptic packaging presupposes that the product itself is sterile when loaded into the container. So far as food products are concerned, this implies that the food has been in some way processed, for example cooked or partly-cooked, in such a way that it remains for a long enough period of time at a lethal temperature to kill all vegetative cells and potential harmful and spoilage organisms.

Such processing, to be effective as far as sterilization is concerned, must be such as to ensure that a lethal temperature prevails throughout the product. In the case of liquids this is not difficult o achieve, but for solid products it can be more difficult. In general it is necessary to reach a temperature of the order of at least 110° C., and preferably higher, in order to ensure a satisfactory lethal effect on harmful and spoilage organisms.

One particular form of cooking or part-cooking is deep frying. It is inherent in the frying process that the frying medium (hereinafter referred to as "oil", which term is to be understood to embrace in practice all oils and fats suitable for deep frying purposes) is very hot. The hot oil rapidly causes the familiar hard crust or skin to form on the outside surface of the product, if the latter has not previously been given such a crust or skin such as batter. During the short time in which the product is immersed in the oil, the rate of heat transfer from the outside surface into the centre of the product is for most products insufficient to enable the centre to reach the same temperature as the oil. Indeed, were it to do so the product would in many cases be overcooked.

The internal temperature of the product is determined by the water within it. Thus under typical conditions of conventional deep frying, with the oil at a temperature usually in the approximate range 150° C. to 200° C., the internal temperature of the product will only be able to increase above 100° C. (212° F.), i.e. the normal boiling point of water, at points from which the water has evaporated.

Thus in deep frying, conditions lethal to unwanted organisms, and such as to sterilise the product, can only arise if the product is, or becomes while immersed in the hot oil, completely free of water, or if it stays in the oil for a very long time. With conventional frying, this precludes sterilization for most products.

The temperatures that are lethal to most microorganisms lie above 110° C. For most practical purposes temperatures in the range 110° C.–150° C. would be used. Temperatures above 150° C. are more effective but unnecessarily high. Accordingly the pressure applied in the process of this invention must be high enough to elevate the boiling point of the water in the product to at least 110° C., and preferably much nearer to 150° C. The applied pressure is accordingly at least 6 pounds per square inch (41368 Pa) above ambient pressure. In order to obtain a water boiling temperature of 148° C. (298° F.), the applied pressure is 50 pounds per square inch (344738 Pa) above ambient. This latter value is a preferred value for the applied pressure.

An object of the invention is to provide a sterilizing, process whereby, the use of deep freezing for the long-term preservation of solid food products of kinds which would otherwise deteriorate unacceptably (by allowing parasitic organisms, or organisms such as to cause food poisoning or spoilage, to propagate) is avoided.

Further objects are to achieve reduced cost and elimination of changes in texture or colour due to freezing or frozen storage.

Another object is to enable the sterile products, aseptically packed, to be stored for long periods, transported and marketed under ambient conditions, quite safely.

Yet another object is to provide a process whereby certain food products (such as potato chips) for which conventional canning is for various reasons entirely unsuitable.

A food product which is found to be particularly suitable for sterilization and aseptic packaging using the process of this invention is potato chips. The term "chips", as used herein, means potato pieces or reconstituted potato starches and powders, the pieces being deep-fried. Such a piece (whether before, during or after frying) is referred to as "chip". In the cooked state, chips are sometimes called French fried potatoes.

Chips are just one of a number of food products which have never been successfully canned commercially because they deteriorate in colour, texture and flavour. They are made on a large scale by suppliers to supply catering establishments for immediate use. Chips are also made by manufacturers of frozen food, being packed by them and supplied frozen to wholesalers and retain outlets. This requires that the chips be capable of being warehoused, transported and stocked on the shelves of traders, sometimes for considerable periods of time, before reaching the final consumer. Chips for freezing are produced either raw, or partially fried, or fully cooked and ready to be merely re-heated in an oven before being consumed. If supplied raw, the chips may be blanched, i.e. subjected to boiling water or steam to deactivate spoilage enzymes. This also reduces initial bacterial loads. However, unless required for immediate use, the only reasonably satisfactory way of preserving chips for storage, transport, display in a shop, or the like, is by deep freezing them. Thus, deep freezing is currently the universally standard method of preserving chips.

Unfortunately, even chips that have been frozen have a flavour, and often a texture, which is noticeably different from those of chips cut from fresh potatoes and immediately fried and then eaten. More significantly from the point of view of industrial application, the energy used in freezing the chips and maintaining them in a frozen condition until required, and the need in many cases to provide suitable frozen-food transport, increases the cost of the product quite considerably.

A process according to the invention in a preferred form will now be described, by way of example only, with reference to the drawings in this application, in which.

Figure 1:
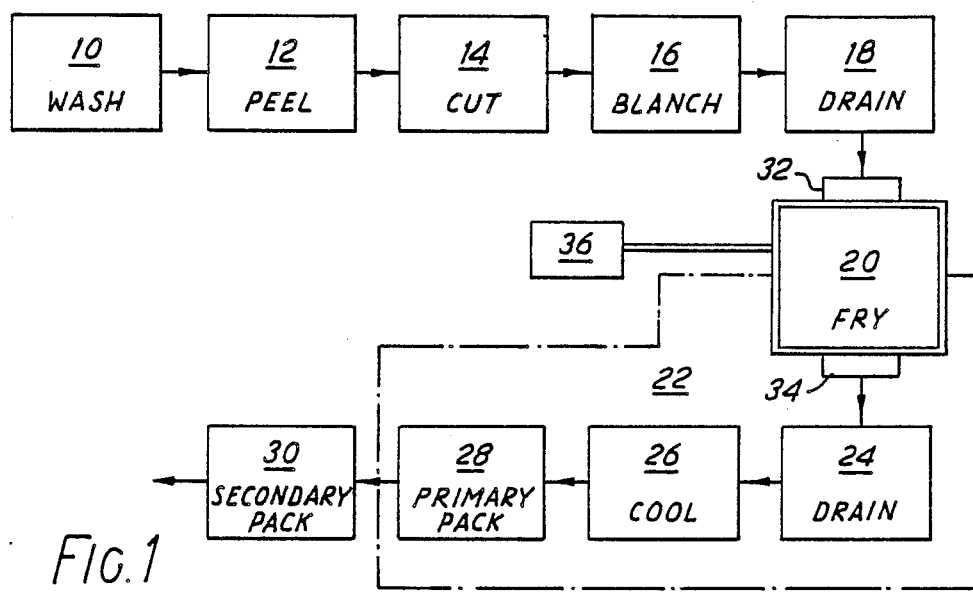
FIG. 1 is a flow diagram illustrating a typical process, according to the invention, for the preparation of packaged, shelf-stable vegetable products.

Referring to FIG. 1, the process will be described in particular reference to potato chips.

The apparatus illustrated diagrammatically in FIG. 1 comprises a washing unit 10 for raw potatoes, a peeler 12 for removing the peel, a cutting machine 14 for slicing the potatoes into raw chips, a blanching vessel 16, and a drainer 18. These units are connected in series, in the order mentioned, so as to deliver blanched, raw chips to a sterilizer 20 in which the chips are sterilized after which they are delivered from the sterilizer 20 into a sterile or aseptic zone, represented by phantom lines at 22 and typically comprising an enclosure.

In the sterile zone, connected in series, are a drainer 24 for excess oil, a cooling unit 26 in which the temperature of the chips is reduced to ambient temperature, and a primary packaging machine 28 in which they are hermetically-sealed in a suitable wrapping material or container to form a pack. Connected to the outlet of the primary packaging machine 28 is a secondary packaging machine 30 in which the packs are further packaged in further containers, each of the latter containing one or more packs.

In the sterile enclosure 22, a sterile gas is maintained at a pressure slightly higher than ambient, the gas being introduced to the enclosure after having been suitably treated to render it microbiologically sterile.

The units 10, 12, 14, 16, 18, 24, 26, 28 and 30 may be of any suitable kinds, including known kinds. The sterilizer 20 comprises a reaction vessel having pressure lock chambers 32, 34 at the inlet and outlet respectively of the vessel, to enable freshly cut chips to be introduced into, and released from, the sterilizer while the pressure inside the reaction vessel is elevated above ambient pressure. The sterilizer has means (indicated diagrammatically at 36) for applying this elevated pressure.

The freshly cut chips, once introduced into the sterilizer 20, are immersed in hot, deep-frying oil under this applied elevated pressure, which is such as to elevate the boiling point of water to at least a working temperature of 110° C. lethal to vegetative cells and potentially harmful and spoilage micro-organisms and spores in the chips. The oil is at a temperature chosen to be at least equal to this elevated boiling point of water, so that water in the chips is caused to vaporise at a temperature of at least 110° C.

Figure 2:
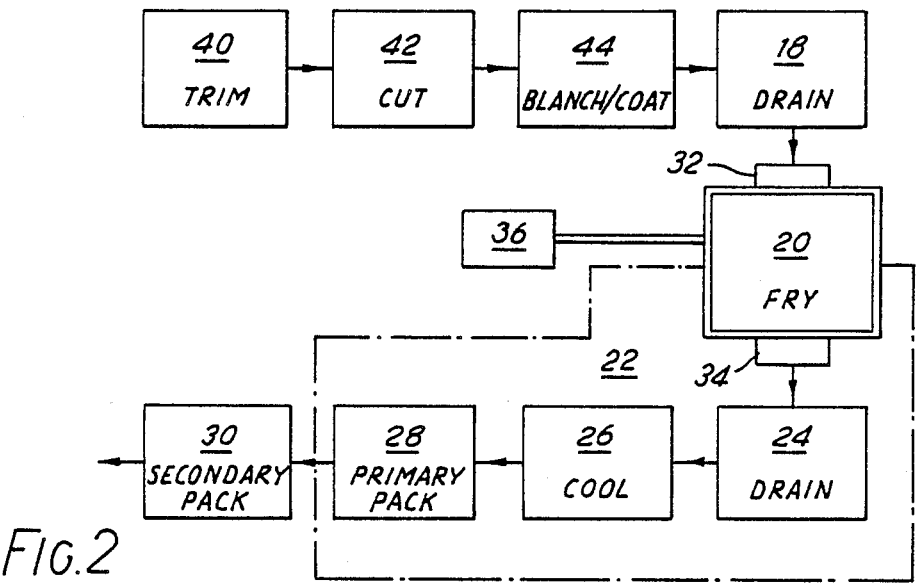
FIG. 2 is a similar diagram illustrating a typical process according to the invention for the preparation of packaged, shelf-stable meat or fish products.

The apparatus illustrated in FIG. 2 is suitable for meat or fish products, and is the same in layout, and operation as that shown in FIG. 1 except that in place of the units 10, 12, 14 and 16 there is a series of units comprising a trimmer 40, a cutter 42 and a blancher/coater 44.

It will be understood that those parts of the system upstream and downstream of the sterilizer may take any convenient form according to the nature of the product being prepared, the starting material, and the various steps in the chosen process before and after the actual sterilizing operation.

Figure 3:
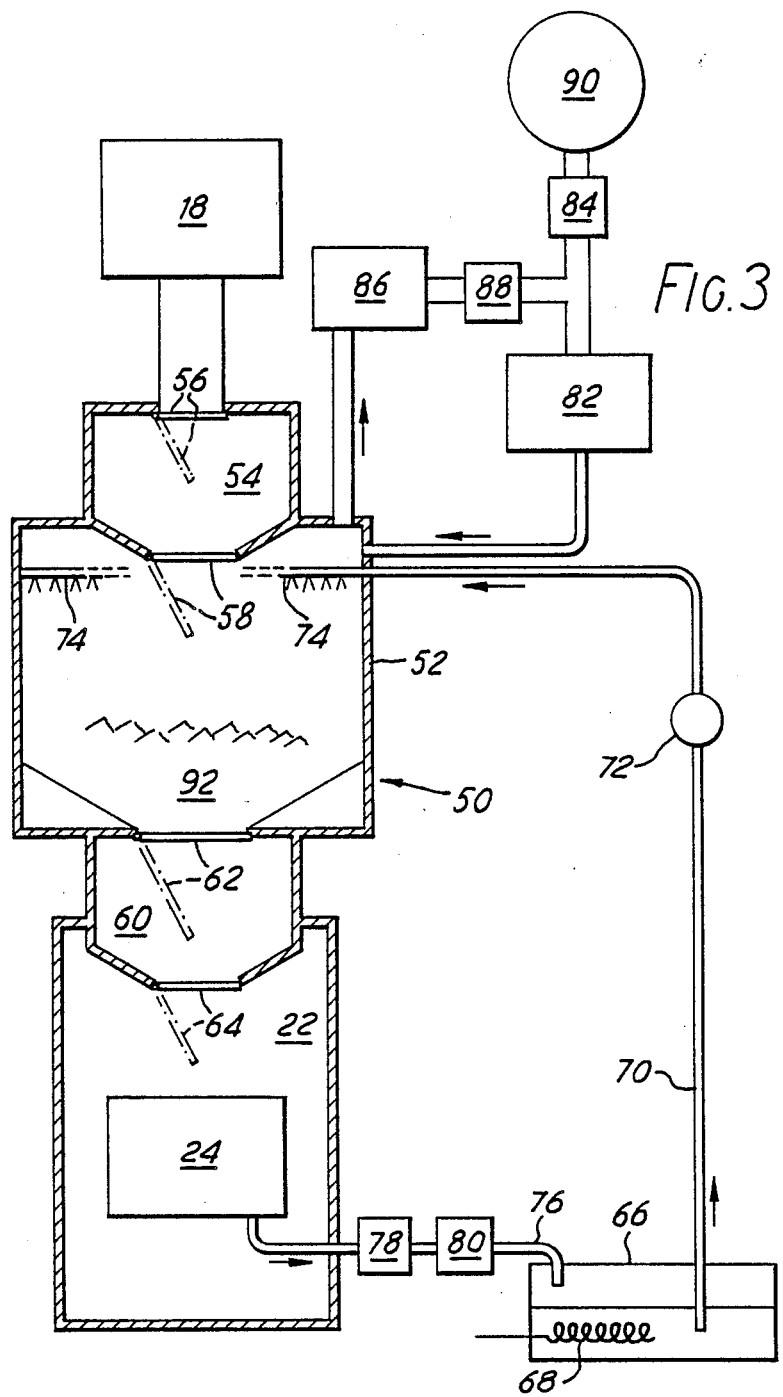
FIG. 3 is a purely diagrammatic illustration showing in general terms one form of sterilizer in which the invention may be practised.

The sterilizer may take any one of a number of forms, FIG. 3 being a highly diagrammatic representation of but one such form.

Referring to FIG. 3, a sterilizer 50 comprises a reaction vessel 52 with an inlet at the top and an outlet at the bottom. The inlet comprises a pressure-lock chamber 54 formed as a hopper and having an inlet door 56 and a bottom door 58; similarly the outlet comprises another pressure-lock chamber 60 with similar doors 62, 64. These various doors, when closed, all provide pressure-tight seals. In the form shown in FIG. 3, the drainer 18 is connected with the inlet hopper 54. The sterile zone 22 with the drainer 24 are also shown.

A reservoir 66 for edible oil, provided with a heater 68 for heating the oil has an oil outlet 70 connected, through a pump 72, with a series of spray heads 74 inside the reaction vessel 52. An oil inlet 76 of the reservoir 66 is connected through a filter 78, and a suitable device 80 for separating water from the oil, with an oil drain in a lower portion of the drainer 24, the oil drain being in this example above the level of the reservoir oil inlet 76 so that oil can drain to the latter under gravity.

The apparatus further includes a pressurising system comprising a gas compressor 82, which is connected in circuit with the interior of the reaction vessel 52 for the purpose of circulating compressed gas through the latter. The gas in this example is nitrogen, for which purpose the gas circuit is a closed circuit, having a suitable connection to a suitable source 90 of nitrogen through appropriate valving and pressure-regulating means indicated at 84.

Means (not shown) are provided for adjusting and regulating the nitrogen pressure in the reaction vessel 52, the temperature of the oil delivered to the spray heads 74, and the period of time for which the oil pump 72 operates. Preferably, interlocks (not shown) are provided whereby the doors 56 and 58, or 58 and 62, or 62 and 64, cannot normally be open simultaneously, or at all when either the oil pump or the compressor is operating. The gas circuit includes also a condenser 86, upstream of the compressor 82, for the purpose of cooling the returning nitrogen and removing water and water-soluble impurities therefrom, and a filter 88 for the removal of any solid particles entrained in the nitrogen gas.

In operation, when the hopper 54 has been filled from the drainer 18, its upper door 56 is closed and its lower door 58 opened to release the batch of chips 92 into the reaction vessel 52, the bottom door 62 of which is closed. The nitrogen compressor 82, unless already running, is started, pressurising the vessel to a predetermined value of 50 pounds per square inch (344738 Pa) above ambient. The oil in the reservoir 66 is being maintained at the processing temperature by the heater 68. With the nitrogen pressure at its predetermined value, the oil pump 72 is started and run for three minutes, at the end of which time it is stopped. Whilst the pump 72 is running, hot oil is sprayed liberally and continuously by the spray heads 74 onto the chips, in such quantities and at such a rate as to ensure that all of the chips are immersed in the oil, throughout the three-minute period, thereby being sterilized.

With the bottom release door 64 closed, the door 62 is opened, so as to drup the chips now sterilized to the above-mentioned degree into the lower pressure lock 60; the door 62 is closed and the door 64 opened to release the chips and the used oil into the drainer 24, whence the oil is returned via the inlet 76 to the reservoir 66.

It will be noticed that the chips, once sterilized, are maintained under aseptic conditions until sealed into their primary packaging containers by the machine 28 (FIG. 1).

The packs of chips are subsequently stored and distributed at ambient temperatures, without being frozen. The period of time between the chips being packed and being cooked and eaten may be several weeks or even months.

During the immersion of the chips in the hot oil in the reaction vessel, the surface temperature of each chip is raised to approximately that of the oil. Due to the pressure applied by the compressed gas, the temperature of the water in the interior of each chip is increased by heat transfer from the oil up to a valve of 148° C., but the temperature is prevented from increasing further by virtue of partial evaporation of the water. The process time chosen is far too short to give rise to any danger of the chip drying out. The whole of the chip is therefore itself at this temperature, so that by the end of the predetermined period of time (the process time) during which the chips are immersed in the hot oil, all significant micro-organisms in the chips, and their spores, are destroyed.

One possible end use for the chips is in automatic chip vending. Chip vending machines at present require to be replenished frequently with chips which have been frozen. The machine heats the chips by means of hot air or by immersion in hot oil, and dispenses them to the consumer. Thus use of chips, prepared by a method such as is described above, in a vending machine, can reduce wastage and permit the chips to be stored for, and transported to, the machine without the need for refrigerated storage or transport.

I claim:

1. A process for sterilizing a solid food product having water as a constituent thereof, said process comprising the steps of:

introducing the solid food product into a reaction vessel;

introducing a pressurized gaseous medium into the reaction vessel so as to subject the solid food product to an applied pressure which is sufficient to elevate the boiling point of water to at least 110° C.;

heating a cooking oil or fat to a temperature which is at least equal to said elevated boiling point of water;

continuously supplying the heated oil or fat to the reaction vessel for a predetermined period of time so as to immerse the solid food product in the heated oil or fat with the solid food product subjected to said applied pressure;

said predetermined period of time being sufficient to partly vaporize water in the solid food product and heat the interior of the solid food product to no more than the elevated boiling temperature of water, and long enough to sterilize the solid food product, but not long enough to allow drying out of the solid food product;

at the end of said predetermined period of time, halting the supply of heated oil or fat and releasing the solid food product from said applied pressure;

removing the solid food product from the reaction vessel and separating the solid food product from the heated oil or fat under aseptic conditions; and hermetically sealing the solid food product in a container while still under aseptic conditions.

2. A process according to claim 1, wherein the solid food product is potato chips.

3. A process according to claim 1, wherein said applied pressure is at least 6 pounds per square inch above the prevailing ambient pressure.

4. A process according to claim 1 wherein said applied pressure is about 50 pounds per square inch above the prevailing ambient pressure, and the temperature of the heated oil or fat is at least 150° C.

5. A process according to claim 1 wherein said predetermined period of time is approximately three minutes.

6. A process according to claim 2 wherein said predetermined period of time is approximately three minutes.

7. A process according to claim 3 wherein said predetermined period of time is approximately three minutes.

8. A process accordong to claim 4 wherein said predetermined period of time is approximately three minutes.

9. A process as claimed in claim 1 in which in the step of introducing the solid food product into the reaction vessel, the solid food product is introduced into the reaction vessel through a first pressure lock; and in the combined step of removing the solid food product from the reaction vessel and separating the solid food product from the heated oil or fat, the solid food product is transferred from the reaction vessel through a second pressure lock to a drainer in which the separation is performed.

* * * * *